US008655227B2

(12) United States Patent
Nishimura et al.

(10) Patent No.: US 8,655,227 B2
(45) Date of Patent: Feb. 18, 2014

(54) OPENING AND CLOSING APPARATUS (75) Inventors: Yoichiro Nishimura, Nagoya (JP); Kumiko Kuriki, Nagoya (JP); Yukio Shiohara, Nagoya (JP); Kazuhito Ishida, Ichinomiya (JP); Masahisa Kato, Nagoya (JP); Tomohisa Higuchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 382 days.

(21) Appl. No.: 13/072,739

(22) Filed: Mar. 27, 2011

(65) Prior Publication Data

US 2011/0241511 A1    Oct. 6, 2011

(30) Foreign Application Priority Data

Mar. 30, 2010 (JP) .................. 2010-079433
Mar. 31, 2010 (JP) .................. 2010-080663

(51) Int. Cl.
*G03G 15/00* (2006.01)
(52) U.S. Cl.
USPC .............................................. 399/125
(58) Field of Classification Search
USPC .................. 399/125; 220/815, 811, 812
See application file for complete search history.

(56) References Cited

U.S. PATENT DOCUMENTS 3,841,466 A * 10/1974 Hoffman et al. ............ 206/205
4,816,921 A    3/1989 Akiyama et al.
5,205,073 A    4/1993 Lyons, Sr.
7,804,628 B2 * 9/2010 Hashimoto et al. ......... 358/494
2006/0029424 A1    2/2006 Kawai et al.
2007/0119548 A1 * 5/2007 Anderson ................... 160/211
2008/0237252 A1 * 10/2008 Elefante ..................... 220/811
2010/0040394 A1    2/2010 Iijima
2011/0240668 A1    10/2011 Nishimura et al.
2011/0243608 A1    10/2011 Nishimura et al.

FOREIGN PATENT DOCUMENTS

| EP | 0199454 A2 | 10/1986 |
| FR | 2734308 A1 | 11/1996 |
| JP | H01-029815 Y2 | 9/1989 |
| JP | H04-052783 A | 2/1992 |
| JP | H05-019543 A | 1/1993 |

(Continued)

OTHER PUBLICATIONS

European Patent Office, extended European Search Report for European Patent Application No. 11159633.4, (counterpart European patent application), dated Feb. 11, 2013.

(Continued)

*Primary Examiner* — Walter L Lindsay, Jr.
*Assistant Examiner* — Rodney Bonnette
(74) *Attorney, Agent, or Firm* — Baker Botts L.L.P.

(57) ABSTRACT

The opening and closing apparatus includes a lower unit case, an upper unit case, a hinge, a lower guide member, an upper guide member and an opening/closing linking unit. The upper unit case is configured to open and close with respect to the lower unit case. The lower guide member is disposed in the lower unit case, and the upper guide member is disposed in the upper unit case. The opening/closing linking unit includes a first rotating member, a second rotating member and a linking portion. As the upper unit case is closed, the opening/closing linking unit moves from the base end side toward the distal end side along the upper guide member and the lower guide member.

11 Claims, 5 Drawing Sheets (56) References Cited

FOREIGN PATENT DOCUMENTS

| JP | H05-333610 A | 12/1993 |
|---|---|---|
| JP | H06-167841 A | 6/1994 |
| JP | H08-054810 A | 2/1996 |
| JP | H11-038714 A | 2/1999 |
| JP | 2000-159251 A | 6/2000 |
| JP | 2005-297278 A | 10/2005 |
| JP | 2006-044061 A | 2/2006 |
| JP | 2007-336451 A | 12/2007 |
| JP | 2010-045736 A | 2/2010 |

OTHER PUBLICATIONS

European Patent Office, extended European Search Report for European Patent Application No. 11159634.2 (counterpart European patent application), dated Feb. 8, 2013.

Japan Patent Office, Decision to Grant a Patent for Japanese Patent Application No. 2010-080663 (counterpart to above-captioned patent application), mailed Apr. 25, 2012.

State Intellectual Property Office of the People's Republic of China, Notification of First Office Action for Chinese Patent Application No. 201110083718.8 (counterpart to above-captioned patent application), mailed on May 31, 2013.

United States Patent and Trademark Office, Non Final Rejection or U.S. Appl. No. 13/072,721 (related to above-captioned patent application), mailed Jun. 13, 2013.

United States Patent and Trademark Office, Notice of Allowance for U.S. Appl. No. 13/072,725 (related to above-captioned patent application), mailed Jun. 19, 2013.

* cited by examiner

OPENING AND CLOSING APPARATUS

CROSS REFERENCE TO RELATED APPLICATION

The present application claims priority from Japanese Patent Applications No. 2010-079433, which was filed on Mar. 30, 2010, and No. 2010-080663, which was filed on Mar. 31, 2010, the disclosures of which are incorporated herein by reference in their entirety.

BACKGROUND

1. Field of the Invention

The present invention relates to an opening and closing apparatus, particularly an upper unit case opening and closing apparatus, in which an upper unit case is opened and closed with respect to a lower unit case.

2. Description of the Related Art

An upper unit case opening and closing apparatus, in which an upper unit case is connected to a lower unit case via a gas spring, and a coil spring is attached to an inner surface of the upper unit case, is known. In the upper unit case opening and closing apparatus, when the upper unit case is closed, an end of the coil spring is supported on the lower unit case and the upper unit case is prevented from closing suddenly toward the lower unit case.

In the upper unit case opening and closing apparatus, a large number of components and large-sized components such as a gas spring are needed. Thus, a configuration of the apparatus may be more complicated and a size of the apparatus may be larger.

SUMMARY

A need has arisen to provide an opening and closing apparatus in which the components can be simplified and downsized.

According to an embodiment of the present invention, the opening and closing apparatus includes a lower unit case, an upper unit case, a hinge, a lower guide member, an upper guide member and an opening/closing linking unit. The upper unit case is disposed above the lower unit case and is configured to open and close with respect to the lower unit case. The hinge is configured to connect the upper unit case to the lower unit case such that the upper unit case pivots with respect to the lower unit case. The lower guide member is disposed in the lower unit case and extends from a base end side toward a distal end side of the lower unit case. The upper guide member is disposed in the upper unit case and extends from a base end side toward a distal end side of the upper unit case. The opening/closing linking unit includes a first rotating member, a second rotating member and a linking portion. The linking portion is configured to link the first rotating member and the second rotating member. As the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member.

DESCRIPTION OF THE PREFERRED EMBODIMENTS

A first embodiment of the present invention will be described with reference to FIGS. 1 to 4.

Figure 1A:
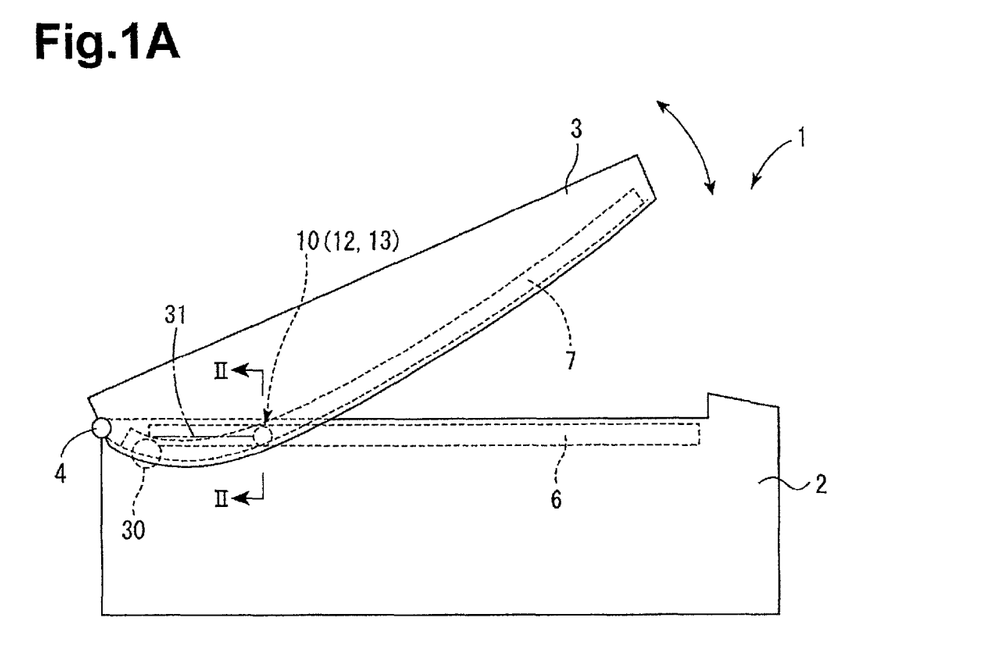
FIG. 1A is a schematic side view illustrating a state of an intermediate stage in opening the upper unit case with respect to the lower unit case of the first embodiment.
Figure 1B:
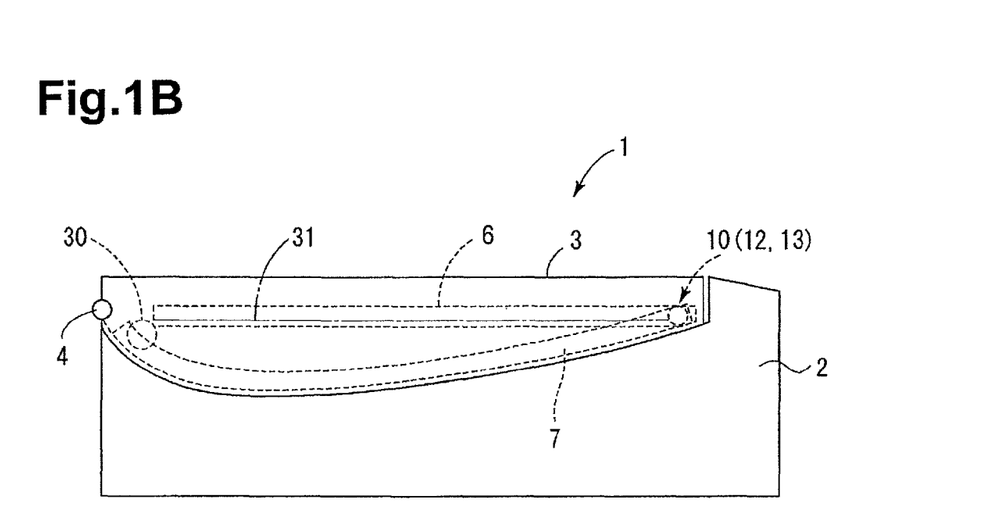
FIG. 1B is a schematic side view of a state in which the upper unit case is closed.

An image recording apparatus 1 according to the first embodiment of the present invention is a multi-function device (MFD) equipped with printing, copying, scanning, and facsimiling functions. As illustrated in FIGS. 1A and 1B, an upper unit case 3 is perpendicularly swingably connected with hinges 4 to a side of a plastic lower unit case 2 of the image recording apparatus 1.

The lower unit case 2 has the following structure, which is not shown. That is, a recording portion using an inkjet method or the like is disposed above a sheet feeding cassette. A sheet of paper (recording medium) supplied from the sheet feeding cassette is transported to the recording portion through a U-shaped transport guide which is detachably attached to a rear side, a printed sheet is ejected from an opening which is formed above the sheet feeding cassette on a side of the lower unit case 2. The sheet feeding cassette is insertable through an opening.

The upper unit case 3 includes an automatic document feeding unit and an image scanning unit for purposes such as reading an original document in copying or in facsimiling (not shown). The upper unit case 3 also includes a glass plate for supporting the original document, a document cover that covers the upper side of the original document, and an operation panel where a variety of operation buttons, a liquid crystal display and so forth are arranged (not shown).

Next, an opening and closing apparatus, which allows the lower unit case 2 and the upper unit case 3 to be opened and to be closed, will be described. The lower unit case 2 and the upper unit case 3 are respectively provided with a lower guide member 6 and an upper guide member 7, both of which extend from the hinge 4 side to an open end side. An opening/closing linking unit 10 is disposed in connection with the lower guide member 6 and the upper guide member 7. The opening/closing linking unit 10 is structured such that a first rotating member 12, which is movable along the upper guide member 7, and a second rotating member 13 which is movable along the lower guide member 6, are rotatably mounted on a spindle 14 (an example of a linking portion) fixed on a frame 11 having a certain shape.

In the first embodiment, the lower guide member 6 substantially horizontally and substantially linearly extends from the hinge 4 side toward the open end side. The upper guide member 7 extends in a downwardly convex curve from the hinge 4 side toward the open end side (refer to FIGS. 1A and 1B).

Figure 2A:
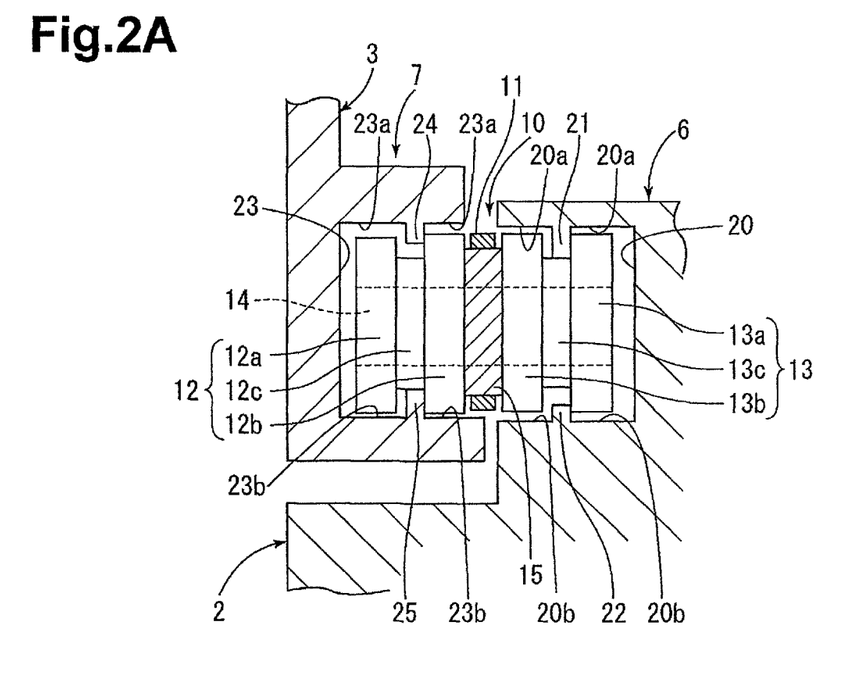
FIG. 2 is an enlarged sectional view taken along line II-II in FIG. 1A.
Figure 2B:
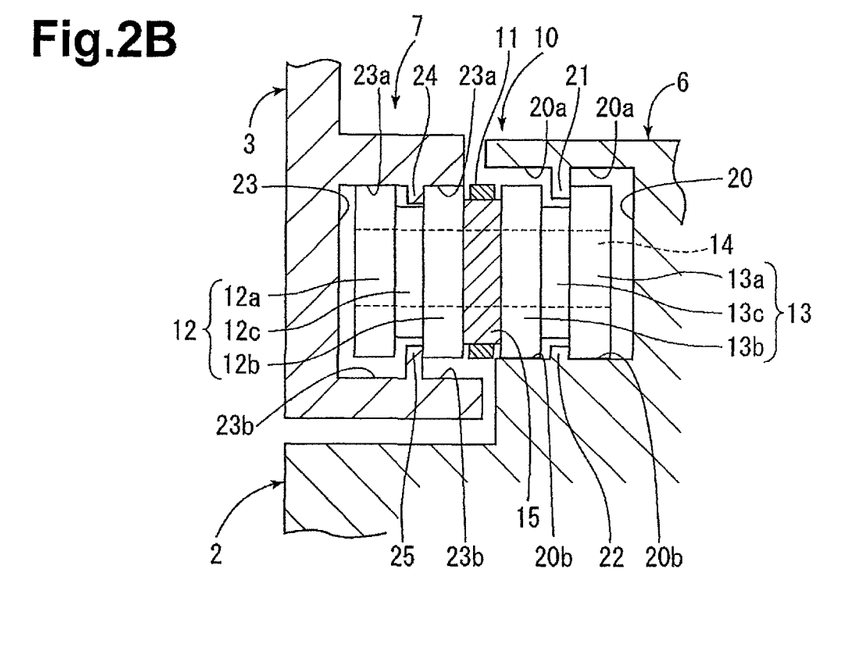

The upper guide member 7 is disposed on the inner surface of the side plate of the upper unit case 3 such that a guide groove 23 is inwardly open (refer to FIGS. 2A and 2B). When the upper unit case 3 is closed with respect to the lower unit case 2, the upper guide member 7 is positioned outside a lower guide member 6 of the lower unit case 2 in order to prevent interference of the intermediate portion of the downwardly convex upper guide member 7 with the lower unit case 2.

As illustrated in FIGS. 2A and 2B, a circular-shaped braking member 15, which is a friction member having a large friction coefficient and formed of, for example, rubber, is fitted in a central portion in the axial direction of the spindle 14. The braking member 15 is secured to the frame 11 or the spindle 14 with adhesive or the like so as not to rotate relative to the frame 11 or the spindle 14. The first rotating member 12 and the second rotating member 13 are disposed on both sides of the frame 11 and the braking member 15 so as to sandwich the frame 11 and the braking member 15 therebetween.

The first rotating member 12 is disposed in such a manner that two large diameter rollers 12a and 12b (an example of two first large diameter rollers) sandwich a small diameter roller 12c (an example of a first small diameter roller) therebetween. These rollers are secured to each other with adhesive or the like so as to rotate as an integrated unit. Likewise, the second rotating member 13 is disposed in such a manner that two large diameter rollers 13a and 13b (an example of two second large diameter rollers) sandwich a small diameter roller 13c (an example of a second small diameter roller) therebetween. These rollers are secured to each other with adhesive or the like so as to rotate as an integrated unit. The small diameter rollers 12c and 13c are formed of a material having a friction coefficient smaller than that of the large diameter rollers 12a, 12b, 13a, and 13b.

As illustrated in FIGS. 2A and 2B, the lower guide member 6 is formed on the upper side of a side surface of the lower unit case 2. The lower guide member 6 includes a guide groove 20, the vertical dimension of which is a little larger than the diameters of the two large diameter rollers 13a and 13b of the second rotating member 13, and ribs 21 and 22 (an example of a protrusion) that protrude so as to oppose each other from the top and bottom in the guide groove 20. Upper guide surfaces 20a and lower guide surfaces 20b of the guide groove 20 face outer peripheries of the two large diameter rollers 13a and 13b. The upper and lower ribs 21 and 22 face an outer periphery of the small diameter roller 13c.

Likewise, the upper guide member 7 is formed on the inner surface of the side plate of the upper unit case 3. The upper guide member 7 includes a guide groove 23 the vertical dimension of which is a little larger than the diameters of two large diameter rollers 12a and 12b of the first rotating member 12 and ribs 24 and 25 that protrude so as to oppose each other from the top and bottom in the guide groove 23. Upper guide surfaces 23a and lower guide surfaces 23b of the guide groove 23 face outer peripheries of the two large diameter rollers 12a and 12b. The upper and lower ribs 24 and 25 face an outer periphery of the small diameter roller 12c.

The first rotating member 12 and the second rotating member 13 are arranged such that the two large diameter rollers 12a and 12b (13a and 13b for the second rotating member 13) around the same axis (spindle 14) are spaced apart with the small diameter roller 12c (13c for the second rotating member 13) sandwiched therebetween. In the upper guide member 7, the ribs 24 and 25 provided on the upper and lower guide surfaces 23a and 23b protrude so as to oppose the small diameter roller 12c, and in the lower guide member 6, the ribs 21 and 22 provided on the upper and lower guide surfaces 20a and 20b protrude so as to oppose the small diameter roller 13c. This reduces the large diameter roller 12a and the large diameter roller 12b (13a and 13b for the second rotating member 13) from moving in the axial direction when the upper unit case 3 is opened or closed. Thus, the first rotating member 12 and the second rotating member 13 respectively cannot roll out of the upper guide member 7 and the lower guide member 6 in their central axis directions, thereby ensuring safety by reducing unintentional removal of the opening/closing linking unit 10.

While an opening operation being performed by the user progresses, in which the upper unit case 3 is opened with respect to the lower unit case 2, the opening/closing linking unit 10 gradually moves closer to the hinge 4 side from an open end side along the lower guide member 6 and upper guide member 7. While a closing operation progresses, in which the upper unit case 3 is closed with respect to the lower unit case 2, the opening/closing linking unit 10 gradually moves closer to the open end side from the hinge 4 side along the lower guide member 6 and upper guide member 7.

Figure 4A:
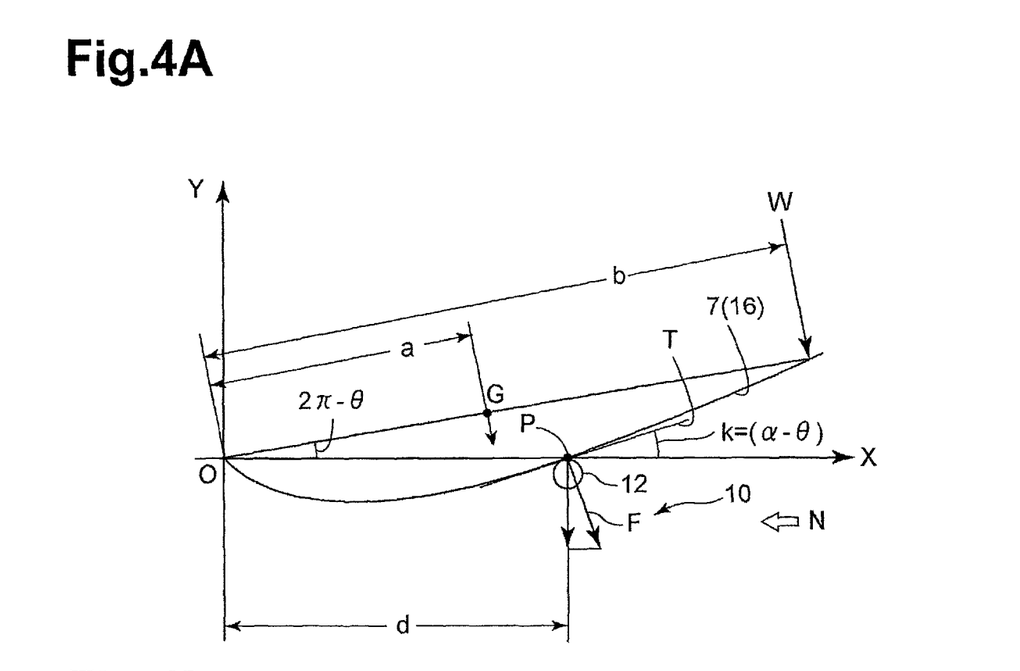
FIGS. 4A and 4B are explanatory drawings illustrating an operation of the first embodiment.
Figure 4B:
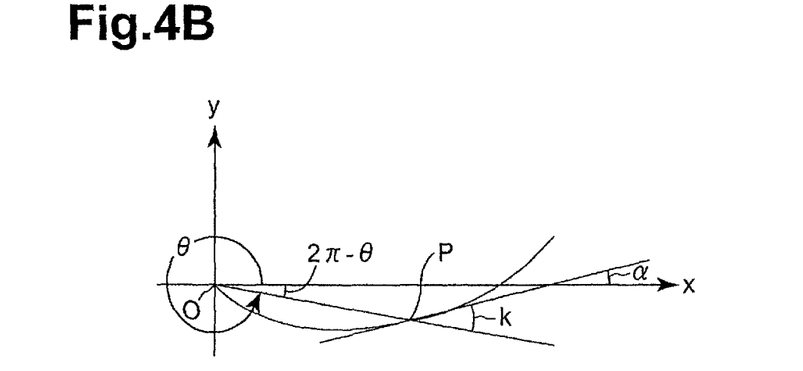

Next, an operation of the opening/closing linking unit 10 in the opening and closing apparatus will be described. It is assumed, as illustrated in FIG. 4A, that the weight mg of the upper unit case 3 (perpendicular direction) acts on the barycenter G (a position away from the position of the hinges 4 (the origin O) by the distance a), and the user manually pushes down on the upper unit case 3 with a load W at a certain position on the upper unit case 3, for example, a position at a free end side and away from the origin O by the distance b. It is also assumed that an angle formed between the x-axis and a line extending from the origin O through the barycenter G and the load W is given by $2\pi-\theta$.

In addition, in a closing operation, it is assumed that the upper unit case 3 is supported by the first rotating member 12 of the opening/closing linking unit 10, and the second rotating member 13 of the opening/closing linking unit 10 is movable along a lower guide surface of the guide groove 20 of the lower guide member 6 that is parallel with the x-axis. It is assumed that a position where the first rotating member 12 contacts an upper guide surface of the guide groove 16 of the upper guide member 7 (contact point) is away from the origin O by the distance d in the x-direction. In this case, it is assumed that the contact point P is positioned on the x-axis. If an angle formed by the x-axis and a tangent line T that is tangent to an upper guide surface of the guide groove 23 of the upper guide member 7 at the contact point P is k, k is given by $k=\alpha-\theta$. In addition, if the contact point is not on the x-axis, the relationship among the angles k, $\alpha$, and, $\theta$ is given by $k=2\pi-\theta=\alpha-\theta$.

When the upper guide member 7 is formed so as to have a downwardly convex shape, it is clear that the contact point P is positioned on a side that is closer to the hinges 4 than the central axis of the first rotating member 12 is.

If a reaction force at the contact point P is F, the equilibrium equation of a moment about the hinges 4 (origin O) is given as follows (* denotes multiplication).

$$a*mg*\cos(2\pi-\theta)+W*b=d*F*\cos k$$

Since $\cos(2\pi-\theta)=\cos\theta$, F is given by equation (1) below.

$$F=[a*mg*\cos\theta+W*b]/[d*\cos k] \quad (1)$$

If a force in a positive direction in the x-axis at the contact point P is S, S is given by the equation below.

S=(x-direction component due to weight of upper unit case 3 and load W)−(x-direction component of frictional force at upper guide member 7 position due to weight of upper unit case 3 and load W)−(x-direction component of load acting on opening/closing linking unit 10)

Here, let N denote (x-direction component of load acting on opening/closing linking unit 10) and $\mu$ denote a coefficient of a static friction between the upper guide member 7 and the first rotating member 12.

Then, S is given by equation (2) below.

$$S=(F^*\sin k)-(\mu^* F^*\cos k)-N \qquad (2)$$

A load N that acts on the opening/closing linking unit 10 is caused by, for example, a frictional force and a brake force generated when the opening/closing linking unit 10 moves along the lower guide member 6 of the lower unit case 2, or a contact friction force generated between the first rotating member 12 and the side surface of the upper guide member 7 and between the second and third rotating members 13 and 14 and the side surface of the lower guide member 6, and a brake mechanism that stops the rotation of the first to third rotating members 12, 13, and 14.

In the present embodiment, the user pushes down on the upper unit case 3 with the load W in a closing operation. Therefore, as illustrated in FIG. 2B, upper peripheries of the large diameter rollers 12a and 12b of the first rotating member 12 are pressed against the upper guide surface 23a of the upper guide member 7. The lower peripheries of the large diameter rollers 13a and 13b of the second rotating member 13 are pressed against the lower guide surface 20b of the lower guide member 6. Therefore, the first rotating member 12 and the second rotating member 13 rotate in opposite directions. For example, in a side view of FIG. 1A, when the closing operation causes the opening/closing linking unit 10 to move to the right, that is, away from the hinges 4, the first rotating member 12 rotates counterclockwise and the second rotating member 13 rotates clockwise.

The braking member 15 is disposed between the first rotating member 12 and the second rotating member 13, and the side surfaces of the braking member 15 are slidably contacted by side surfaces of the large diameter roller 12b of the first rotating member 12 and a side surface of the large diameter roller 13b of the second rotating member 13. Therefore, with frictional force here, the load N that is directed opposite (toward left) the moving direction of the opening/closing linking unit 10 is applied to the opening/closing linking unit 10.

By substituting equation (1) into equation (2), S is given by equation (3) as follows.

$$S=[b^*(\sin k-\mu^*\cos k)/(d^*\cos k)]W+[a^*mg^*\cos \theta^*(\sin k-\mu^*\cos k)]/(d^*\cos k)-N \qquad (3)$$

Here, suppose that U=[b*(sin k−μ*cos k)/(d*cos k)], and V can be given by the following equation.

$$V=a^*mg^*\cos \theta^* U/b$$

Since U and V are constants that are determined when the weight of the upper unit case 3 and the position of the first rotating member 12 are determined, the function S is a linear function of W.

That is, the function of equation (3), S(W), is given by equation (4) below.

$$S(w)=U^*W+(V-N) \qquad (4)$$

Figure 5:
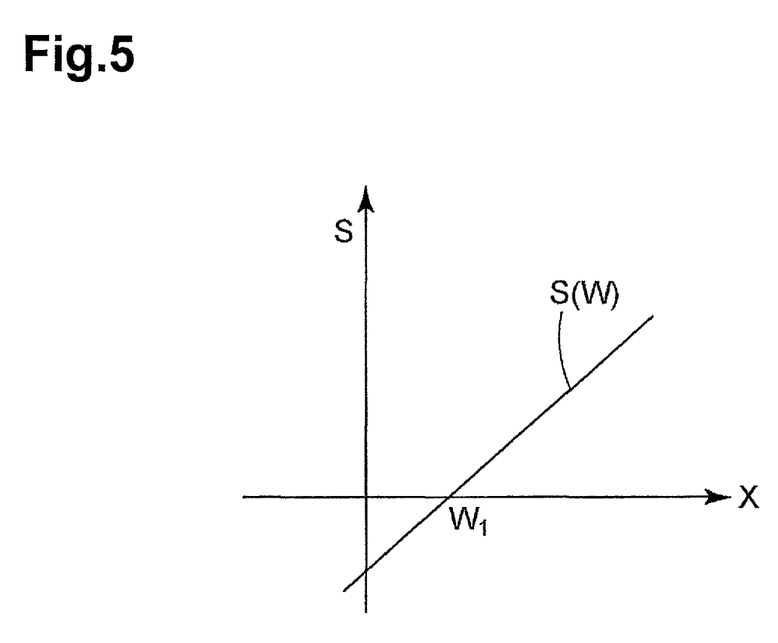
FIG. 5 is a graph for explaining the operation.

Referring to a graph in FIG. 5, the horizontal axis represents W and the vertical axis represents S. By studying a condition under which the opening/closing linking unit 10 in a certain position starts to move in the closing direction (S≥0) by applying W (W≥0), it has been found that U needs to be a positive value and the following condition needs to be satisfied. That is, w1=(V−N)≥0. If U is negative, V also becomes negative. In such a case, the upper unit case 3 is firmly closed and does not move. If U is positive and w1 is negative, a force in a positive direction is constantly applied to the opening/closing linking unit 10 (moving member). Therefore, the upper unit case 3 cannot be held at a position without a manual support.

As described above, in the first embodiment, the upper guide member 7 is formed so as to have a downwardly convex shape, the lower guide member 6 is formed so as to have a linear shape and horizontal orientation, and the opening/closing linking unit 10 is movable therebetween. Thus, when the user applies a downward pressing force W at a certain position of the upper unit case 3, the opening/closing linking unit 10 moves in the closing direction (direction moving away from the hinges 4). In contrast, when the user does not apply the above-described pressing force (that is, does not push down), the opening/closing linking unit 10 can be stopped at a certain position. This can eliminate a related art situation in which a rotation speed of the upper unit case 3 in the closing direction is suddenly increased in the last stage of closing of the upper unit case 3 with respect to the lower unit case 2, and the upper unit case 3 hits the lower unit case 2, thereby generating a loud noise or catching a user's finger. Such problems can also be reduced.

In addition, by adjusting the strength of the pressing force W applied by the user, an effect of decreasing a bouncing movement of the upper unit case 3 that is closed by being moved toward the closed position is achieved.

In the first embodiment, the user applies an upward force to the free end or the like of the upper unit case 3 in opening the upper unit case 3. This causes, as illustrated in FIG. 2A, the lower rib 25 of the upper guide member 7 to upwardly press against the outer periphery of the small diameter roller 12c. A reaction force here causes the upper rib 21 of the lower guide member 6 of the lower unit case 2 to contact the outer periphery of the small diameter roller 13c. Here, since friction forces between the small diameter roller 12c and the rib 25 and between the small diameter roller 13c and the rib 21 are small, the first rotating member 12 does not rotate but slips (slides) along the upper guide member 7 and the second rotating member 13 does not rotate but slips (slides) along the lower guide member 6. Thus, the opening/closing linking unit 10 can move so as to approach the hinges 4. This achieves advantages of decreasing the force applied by the user in an opening direction and of making an opening operation of the upper unit case 3 easier.

By setting the downwardly convex curve of the upper guide member 7 to a predetermined shape, the downward pressing force W by the user can be a constant force regardless of a width of an opening angle of the upper unit case 3.

According to the present invention, to open the upper unit case 3 with respect to the lower unit case 2, the user applies an upward force at a position such as the free end of the upper unit case 3 so as to cause the opening/closing linking unit 10 to move closer to the hinges 4 along the lower guide member 6 and the upper guide member 7. When application of the above-described upward force is stopped, the movement of the opening/closing linking unit 10 stops at a position where the opening/closing linking unit 10 rests when the application of the force is stopped. Thus, the opening angle of the upper unit case 3 can be maintained.

Figure 3:
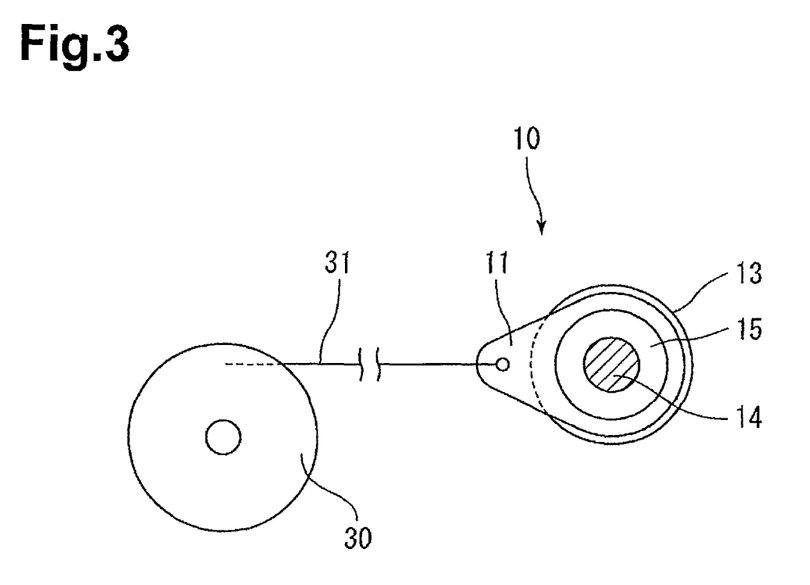
FIG. 3 is a side view illustrating an urging mechanism of an opening/closing linking unit.

As another mechanism for giving the load N toward the opening/closing linking unit 10, as shown in FIG. 3, the opening/closing linking unit 10 is given a load toward the hinges 4 by using urging mechanism having the following structure. That is, the urging mechanism includes a tubular case 30, inside of which a fixing end of a spiral spring is secured, and a string 31 (an example of am urging member), which is formed of a flexible material such as a wire and a fixing end thereof is connected to a free end of the spiral spring. A force in a wind-up direction is applied to the spiral spring in advance and the urging mechanism is set to urge most of the string 31 to be wound up inside the case 30. The case 30 is secured inside the lower unit case 2 on a side close to the hinges 4, and the free end of the string 31 is connected to the frame 11 of the opening/closing linking unit 10 (refer to FIGS. 1A and 1B). Alternatively, the opening/closing linking unit 10 may be given an urging force (a load) toward the hinges 4 with the following structure. That is, a telescopic hydraulic or gas cylinder may be secured inside the lower unit case 2 and the top end of the piston rod may be connected to the frame 11.

The second embodiment, which is not shown, is as follows. That is, the lower guide member 6 having an upwardly convex shape is disposed in the lower unit case 2 so as to extend from the hinge 4 side toward the open end side. An upper guide member 7, which is formed so as to have a linear shape and horizontal orientation when the upper unit case 3 is closed, is provided in the upper unit case 3 so as to extend from the hinge 4 side toward the open end side. The same operational effect as achieved with the first embodiment can be achieved with the structure of the second embodiment. The linearly shaped upper guide member 7 extending toward the open end side may be upwardly or downwardly inclined.

In either of the first and second embodiments, a recess (not shown) is provided at a position away from the hinges 4 in the lower guide surface of the lower guide member 6 (31 in the second embodiment) so as to cause the second rotating member 13 (36 in the second embodiment) to be fitted thereinto when the upper unit case 3 is closed with respect to the lower unit case 2. This fitting of the second rotating member 13 (36 in the second embodiment) into the recess provides a clicking sensation at a closing end position of the upper unit case 3 and allows the upper unit case 3 to be fully closed.

In addition to the above-described embodiments, the present invention may be implemented in a variety of embodiments without departing from the gist thereof. That is, the upper and lower unit cases can be used as bodies and covers of electrical appliances, furniture, and fixtures as well as the image recording apparatuses.

What is claimed is:

1. An opening and closing apparatus comprising:
    a lower unit case;
    an upper unit case disposed above the lower unit case and configured to open and close with respect to the lower unit case;
    a hinge configured to connect the upper unit case to the lower unit case such that the upper unit case pivots with respect to the lower unit case;
    a lower guide member disposed in the lower unit case and extending from a base end side toward a distal end side of the lower unit case;
    an upper guide member disposed in the upper unit case and extending from a base end side toward a distal end side of the upper unit case; and
    an opening/closing linking unit comprising a first rotating member, a second rotating member and a linking portion, the linking portion being configured to link the first rotating member and the second rotating member,
    wherein as the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member, and
    wherein the first rotating member and the second rotating member are disposed to rotate coaxially.

2. The opening and closing apparatus according to claim 1,
    wherein a friction member is sandwiched between the first rotating member and the second rotating member in the opening/closing linking unit,
    wherein as the upper unit case is closed with respect to the lower unit case, the first rotating member contacts and rotates along an upper guide surface of the upper guide member, and the second rotating member contacts and rotates along a lower guide surface of the lower guide member such that the first rotating member and the second rotating member rotate in opposite directions mutually, and
    wherein each of the first rotating member and the second rotating member is configured to contact the friction member to receive a friction force.

3. The opening and closing apparatus according to claim 1,
    wherein the lower guide member has a linear shape and the upper guide member has an downwardly convex shape, and
    wherein the first rotating member is movable along the upper guide member, and the second rotating member is movable along the lower guide member.

4. The opening and closing apparatus according to claim 1,
    wherein the lower guide member includes a recess portion having a recess, and
    wherein, when the upper unit case is closed with respect to the lower unit case, the second rotating member is configured to be fitted into the recess.

5. The opening and closing apparatus according to claim 1,
    wherein each of the upper guide member and the lower guide member has a guide groove having a U shape in a cross section, and
    wherein the guide groove of the lower guide member is open toward a side outer surface of the lower unit case, and the guide groove of the upper guide member is open toward a side inner surface of the upper unit case.

6. The opening and closing apparatus according to claim 5,
    wherein a gap is provided between the guide groove and the opening/closing linking unit in an up-down direction.

7. The opening and closing apparatus according to claim 1,
    further comprising an urging member configured to connect the hinge to the opening/closing linking unit and to give the opening/closing linking unit an urging force toward the hinge.

8. An opening and closing apparatus comprising:
    a lower unit case;
    an upper unit case disposed above the lower unit case and configured to open and close with respect to the lower unit case;
    a hinge configured to connect the upper unit case to the lower unit case such that the upper unit case pivots with respect to the lower unit case;
    a lower guide member disposed in the lower unit case and extending from a base end side toward a distal end side of the lower unit case;
    an upper guide member disposed in the upper unit case and extending from a base end side toward a distal end side of the upper unit case; and
    an opening/closing linking unit comprising a first rotating member, a second rotating member and a linking portion, the linking portion being configured to link the first rotating member and the second rotating member,
    wherein as the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member, and wherein the opening/closing linking unit comprises a shaft configured to rotatably support the first rotating member and the second rotating member.

9. An opening and closing apparatus comprising:

a lower unit case;

an upper unit case disposed above the lower unit case and configured to open and close with respect to the lower unit case;

a hinge configured to connect the upper unit case to the lower unit case such that the upper unit case pivots with respect to the lower unit case;

a lower guide member disposed in the lower unit case and extending from a base end side toward a distal end side of the lower unit case;

an upper guide member disposed in the upper unit case and extending from a base end side toward a distal end side of the upper unit case; and an opening/closing linking unit comprising a first rotating member, a second rotating member and a linking portion, the linking portion being configured to link the first rotating member and the second rotating member, wherein as the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member, wherein a friction member is disposed between the first rotating member and the second rotating member in the opening/closing linking unit, wherein as the upper unit case is closed with respect to the lower unit case, the first rotating member contacts and rotates along an upper guide surface of the upper guide member, and the second rotating member contacts and rotates along a lower guide surface of the lower guide member such that the first rotating member and the second rotating member rotate in opposite directions mutually, and wherein each of the first rotating member and the second rotating member is configured to contact the friction member to receive a friction force.

10. The opening and closing apparatus according to claim 9, wherein the first rotating member is disposed such that two first large diameter rollers coaxially sandwich a first small diameter roller therebetween, and the second rotating member is disposed such that two second large diameter rollers coaxially sandwich a second small diameter roller therebetween, wherein the upper guide member includes a protrusion protruding from a lower guide surface of the upper guide member and facing the first small diameter roller, and the lower guide member includes a protrusion protruding from an upper guide surface of the lower guide member and facing the second small diameter roller, and wherein as the upper unit case is closed with respect to the lower unit case, the two first large diameter rollers rotate while being pressed against the upper guide surface of the upper guide member, and the second two large diameter rollers rotate while being pressed against the lower guide surface of the lower guide member.

11. The opening and closing apparatus according to claim 10, wherein the first small diameter roller, the second small diameter roller, the protrusion positioned on the lower guide surface of the upper guide member, and the protrusion positioned on the upper guide surface of the lower guide member are formed of a material having a small friction coefficient, and wherein as the upper unit case is opened with respect to the lower unit case, the first small diameter roller rotates while being slidably contacted by the protrusion positioned on the lower guide surface of the upper guide member, and the second small diameter roller rotates while being slidably contacted by the protrusion positioned on the upper guide surface of the lower guide member.

* * * * *